United States Patent
Yeung et al.

(10) Patent No.: US 7,389,328 B2
(45) Date of Patent: Jun. 17, 2008

(54) METHOD FOR CONTROL OF PERSONAL DATA

(75) Inventors: Peter Yeung, Kista (SE); Henrik Sandström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 10/544,961

(22) PCT Filed: Jun. 25, 2003

(86) PCT No.: PCT/SE03/01116

§ 371 (c)(1),
(2), (4) Date: Aug. 8, 2005

(87) PCT Pub. No.: WO2004/072885

PCT Pub. Date: Aug. 26, 2004

(65) Prior Publication Data

US 2006/0155842 A1 Jul. 13, 2006

(30) Foreign Application Priority Data

Feb. 11, 2003 (SE) .................................... 0300368

(51) Int. Cl.
*G06F 15/16* (2006.01)
(52) U.S. Cl. ........................ 709/218; 709/216; 709/217; 709/219
(58) Field of Classification Search .................. 709/217, 709/218, 219, 216
See application file for complete search history.

(56) References Cited

U.S. PATENT DOCUMENTS

| 6,336,114 | B1 * | 1/2002 | Garrison ........................ 707/9 |
| 6,922,726 | B2 * | 7/2005 | Basson et al. ............... 709/227 |
| 6,931,434 | B1 * | 8/2005 | Donoho et al. ............. 709/207 |
| 2003/0041109 | A1 * | 2/2003 | Meloni et al. .............. 709/205 |
| 2003/0074456 | A1 | 4/2003 | Yeung et al. |
| 2003/0105864 | A1 | 6/2003 | Mulligan et al. |
| 2003/0120730 | A1 | 6/2003 | Kuno et al. |
| 2003/0135628 | A1 | 7/2003 | Fletcher et al. |
| 2003/0225894 | A1 * | 12/2003 | Ito ............................ 709/227 |

FOREIGN PATENT DOCUMENTS

WO  WO 02091186 A1  11/2002

* cited by examiner

*Primary Examiner*—Benny Tieu
*Assistant Examiner*—Adel Y Youssef
(74) *Attorney, Agent, or Firm*—Thomas Bethea, Jr.

(57) ABSTRACT

The invention relates to end user controlled handling of personal data on e.g. the Internet. Web services are offered in a controlled manner from a service broker (250) provided with appropriate security mechanisms. The broker contains end user controlled policies related to personal data/services, while the actual data is arranged at different locations in the network. Web service information is published in an open registry (256) at the broker. When an application provider (220) finds a desired service in the registry, its service request is guided to the appropriate service broker. The broker returns the policy for the requested service, whereafter the service provider (240) can be contacted, preferably through an encapsulated SOAP message. A preferred embodiment performs common sign on authentication when a new application is contacted.

31 Claims, 6 Drawing Sheets

METHOD FOR CONTROL OF PERSONAL DATA

TECHNICAL FIELD

The present invention generally relates to security in communication systems and in particular to end user controlled handling of personal data on the Internet and similar networks.

BACKGROUND

Web service technologies have recently attracted an explosive interest and are sometimes said to be revolutionizing the Internet. A web service is basically a network accessible interface to application functionality implemented through standard Internet technologies. By means of web services, one piece of software can access objects and methods from another piece of software irrespective of long distances and intermediate firewalls, enabling distributed software systems.

Most web services are packaged in a format based on the Extensible Markup Language (XML) and therefore sometimes referred to as XML web services. A very common protocol for implementing web services is the Simple Object Access Protocol (SOAP), which is built on XML and typically carried by the Hypertext Transfer Protocol (HTTP).

It is plain to see that web services hold the potential to increase the availability of data and services on the Internet, which is not only very advantageous for application developers and data service providers but would eventually also imply that better application services are offered to end users. However, using HTTP, XML and SOAP allows anyone to access a service that has been published as a web service. This might be fine for some content providers like search engines for instance, but typically a straight "line" to the actual data source is not desirable. In particular, person-related data, such as the content of a positioning system, a customer database or a mobile commerce platform, must not be handed out without proper checks.

There are many shortcomings of conventional XML web services, in particular related to security, privacy and transaction processing. (See e.g. [1] for a more elaborate discussion on the shortcomings of web services.) Control of who is allowed to use a particular service, in what way the service may be used, etc, are some of the issues that need to be taken care of for web services to become widely spread in the future.

To be able to exploit the advantages of web services without compromising the end user integrity would thus be very desirable. This object is addressed in several prior-art solutions, such as standard encryption tools, Private Key Infrastructure (PKI) with signatures and certificates, etc. These conventional techniques all focus on a situation where the interacting parties know each other, which in particular for a (mobile) Internet approach is less suitable. The rapidly growing market for web services requires support of "mass partnering", which implies that new approaches are needed.

Another drawback of conventional web service solutions is that while addressing one or a few aspects of web service security, e.g. encryption or signing, they fail to offer a comprehensive approach considering aspects like dynamic routing, exchanging digital user identities or enforcing privacy policies. Yet another problem associated with security solutions for web services is that they typically require special adaptations at both ends and therefore are rather complicated to implement. Moreover, security measures in the prior art are comparatively cumbersome and time demanding.

Accordingly, the security mechanisms of conventional telecommunication systems are far from satisfactory and there is a considerable need for an improved procedure for handling personal data on the Internet.

SUMMARY

A general object of the present invention is to provide an improved method for handling personal data in open networks like the Internet. A specific object is to provide a method for offering web services that involve personal data without compromising the security of end users. Another object is to achieve secure web service messaging between two or more parties. Still another object is to achieve an improved end user authentication procedure in association with web service requests.

These objects are achieved in accordance with the attached claims.

Briefly, the invention proposes a new way of opening up the Internet in a controlled manner through offering web services from a third party provided with appropriate security mechanisms. This third party, the service broker, contains end user controlled policies related to personal data/services, while the actual data is maintained at multiple sites in the network. According to the invention, web service information is published in an open registry at the broker. When for instance an application provider finds a desired service in the registry, an application is developed to make use of this service. As an end user attempts to access the application, the application invokes its web service gateway that guides the service request to the appropriate service broker. The location of the service may be unknown to the application provider. The broker returns the policy agreement for the requested service, whereafter the service provider can be contacted. The actual validation of the request can be performed at the broker, at the requesting side or at the providing side.

Although other web service protocols, e.g. another XML web service protocol, can be used in accordance with the invention, the communication in the network is preferably based on XML SOAP. A preferred embodiment uses a new type of messages referred to as encapsulated SOAP messages to achieve reliable three-party communication. Furthermore, the invention proposes a new common sign on (CSO) procedure for end user authentication every time a new application is contacted. A CSO server is then preferably implemented in the service broker and a digital user identity restricted to the service broker is issued. The CSO server may communicate with a policy repository of the service broker to improve the system performance.

According to other aspects of the invention a communication system and a device for end user controlled handling of personal data are provided.

BRIEF DESCRIPTION OF THE DRAWINGS

The invention, together with further objects and advantages thereof, is best understood by reference to the following description and the accompanying drawings, in which.

DETAILED DESCRIPTION

As outlined in the background section, conventional XML web services are associated with many shortcomings related to security and privacy. The present invention is based on the recognition that these can be overcome by a communication system that is based on the system disclosed in [2] (hereafter referred to as "the classic Lock Box") but which is adapted to web services and provided with additional advantageous functionality in a way that will be described in the following.

Figure 1:
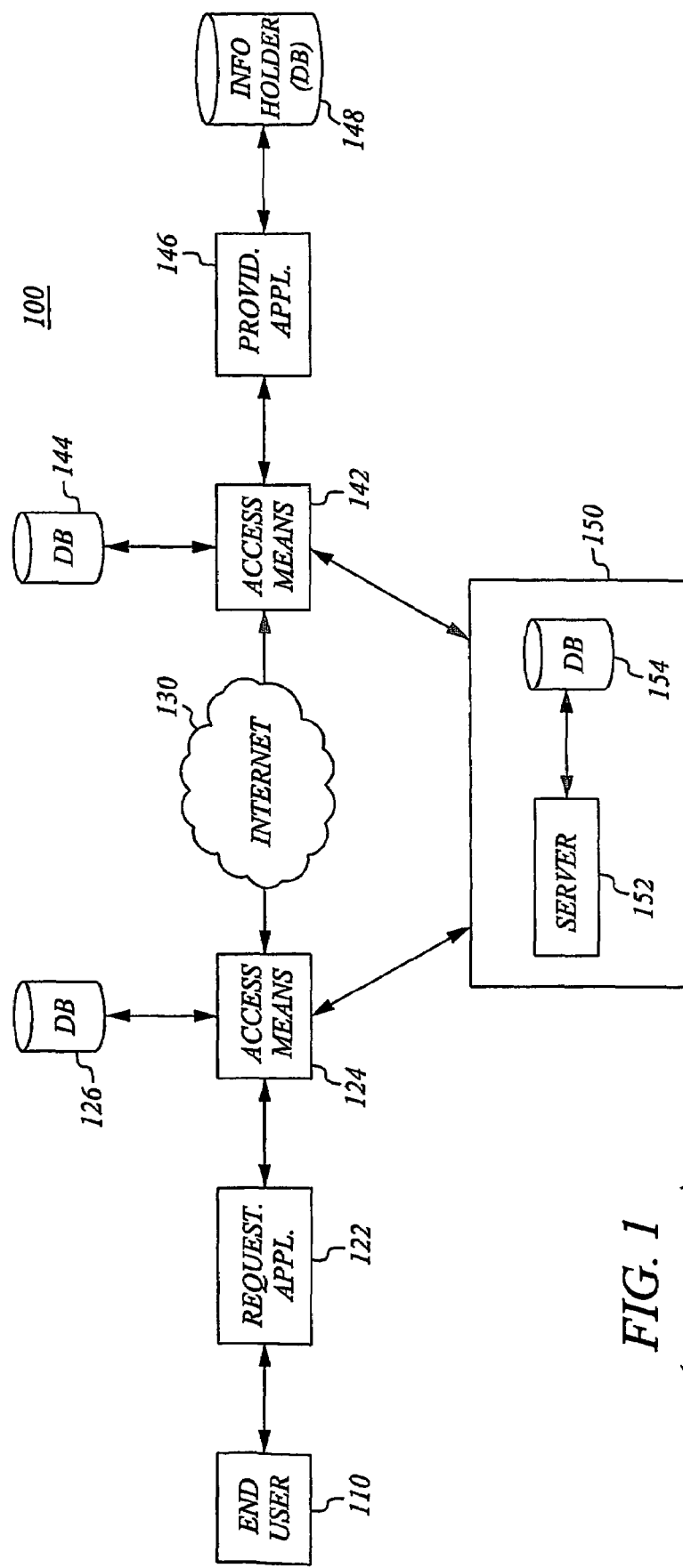
FIG. 1 is a schematic view of a prior art communication system for end user control of personal data.

One implementation of the classic Lock Box is shown in FIG. 1, which is a schematic view of such a prior art communication system for end user control of personal data. The illustrated system 100 includes a requesting application 122 with access means 124, an information providing application 146 with access means 142, central server means 150 comprising a central server 152 and an associated database (DB) 154, and an information holding database 148. Each access means 124, 142 also has a respective database 126, 144. The access means are arranged to communicate with the central server means, which handles information routing and personal profile locking/unlocking using personal protection profiles stored in the database 154.

Upon being contacted by an end user 110, the requesting application 122 typically sends a request for personal profile data located anywhere in the network to the access means 124 for the purpose of either fetching data or setting new data in the personal profile. The access means 124 invokes its database 126 to find out the address of the central server means 150 to which the request should be forwarded. Via secure HTTP (HTTPS), the request is forwarded to the central server 152 which establishes, using the personal protection profiles in database 154, whether the access request should be allowed or not. An indication of rejection or grant is returned to access means 124, which in case of grant uses HTTPS for communication with access means 142 over the Internet 130. Access means 142 contacts the providing application 146, which retrieves the data from the information holding database 148. The information is returned to the requesting application via access means 142, over the Internet 130 and access means 124.

A main feature of the classic Lock Box system 100 is that access rights to personal information are administered by the end user 110 at a central location (the central server means 150), whereas the personal profile data, i.e. the information as such, is distributed throughout the communication system on different sources 148. The end user is thus provided with a central facility where he can lock/unlock, i.e. customize access to, personal information from different providers and to different information requesters.

Moreover, by means of the classic Lock Box the identities of the requesting side can be concealed for the providing side and vice versa. There is no connection between personal information from different locations without going through the user controlled central server means 150. By spreading out the personal profile data at different locations (or at the same location but unrelated) with different user identities, a high degree of end user privacy is obtained.

The messaging in the classic Lock Box system uses XML text. Hereby, a new type of XML forms, which is described in [3], can for example be used. Each information service needs a DTD agreement that defines the allowed flow of data between the concerned communication pair (requesting and providing application). This means that a new XML form has to be created and implemented at the application side every time a new service is provided.

For further details on the Lock Box concept, reference is made to [2].

Figure 2:
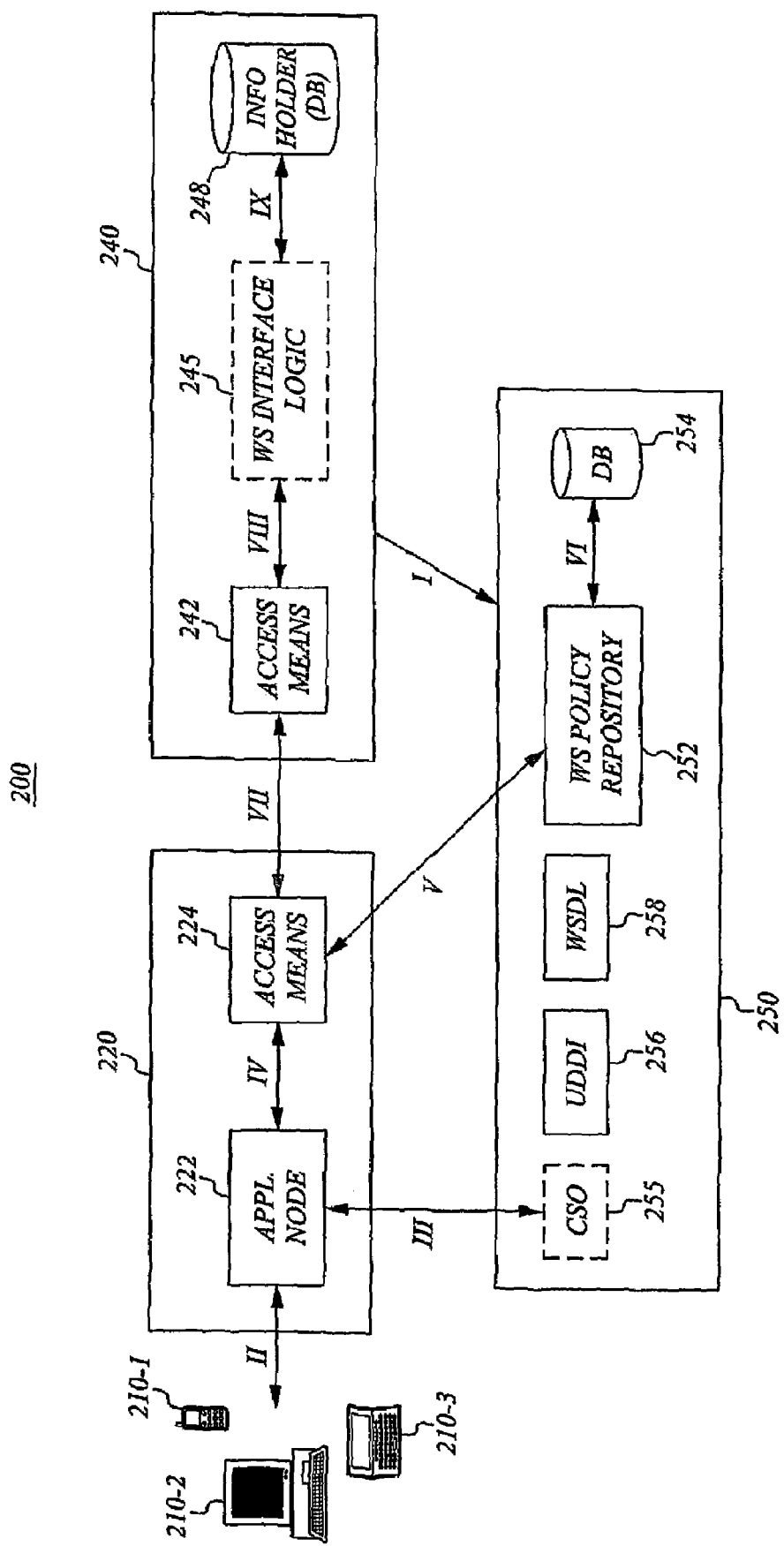
FIG. 2 is a schematic view of a communication system for end user controlled handling of personal data according to an exemplary embodiment of the present invention.

FIG. 2 is a schematic view of a communication system for end user controlled handling of personal data according to an exemplary embodiment of the present invention. A communication system 200 comprising an application unit 220, a data providing unit 240 and a service broker 250 is shown. End users communicating with the application unit 220 are in the figure represented by a cellular phone 210-1, a personal computer (PC) 210-2 and a laptop 210-3. The cellular phone 210-1 typically uses an intermediate device, such as a Wireless Application Protocol (WAP) gateway, to contact the application unit. The application unit 220 comprises an application node 222 and an access means 224, e.g. a web service gateway. The access means 224 can communicate with access means 242 of the data providing unit 240 in order to get (or set) personal data, e.g. biometrics or position data, contained in information holding means 248, such as a database (DB). Between the access means 242 and the database 248 of the data providing unit 240, there is optionally a web service interface logic node 245. Both the application unit 220 and the data providing unit 240 has means for communicating with the service broker 250, which in the illustrated example includes a CSO server 255, a Universal Description, Discovery and Integration (UDDI) server 256, a Web Service Definition Language (WSDL) server 258, and a web service policy repository 252 with an associated database 254.

The communication between the nodes in FIG. 2 is based on a predefined web service protocol, such as a predefined XML web service protocol. Preferably, the messages are exchanged through SOAP over HTTPS but any appropriate web service protocol could be used for packaging messages within the scope of the invention, including other XML-based protocols as well as SOAP based on another transport protocol than HTTP. When using SOAP for service requests, the variables can have an associated variable type (e.g. integer or string), which is advantageous from a programming point-of-view.

The major flows of sequences in the system are in FIG. 2 indicated by arrows I-IX. In an initial set-up procedure the data providing unit 240 communicates a data service to the service broker 250 (I), where it is published in the UDDI server 256. (In practice, this phase would generally include several providers and several services.) An end user 210 that would like to request a published service (and get or set data) contacts the application node 222 with a request message (II). The request is preferably based on SOAP and accompanied by out of band (OOB) data, i.e. non-payload/control information, which will be further described with reference to FIG. 4A. Preferably, a CSO server 255 is invoked from the application node 222 for user authentication purposes (III). In case of a successful authentication, the request is transferred via the access means 224, where it is subject to certain processing, and delivered to the policy repository 252 of the service broker 250 (IV, V). Preferably, the access means 224 comprises a list/database telling where to find the appropriate service broker. The policy repository 252 matches the requested service with the appropriate policy, which is fetched from the database 254 (VI). At this stage, there is generally a user identity change at the service broker in order to conceal the original user identity for the access means 242 of the data providing unit 240 and to help the providing unit 240 identify the end user 210. The policy is preferably returned to the access means 224 together with a response message containing the new user identity (V).

The request validation is performed by the policy repository 252, the access means 224 or the access means 242. In case of a successful request (or in case the validation is to be performed at the access means 242), the data providing unit 240 is contacted (VII), preferably through an encapsulated SOAP message. Its access means 242 dissembles the encapsulated SOAP message such that only the original request from the application node 222 reaches the web service interface logic structure 245 (VIII). This node is optional and mainly serves to terminate SOAP if the information holding means/data source 248 does not support web services. The requested service/data is finally collected at the data source 248 IX and returned to the application node 222 and the end user 210 (IX, VIII, VII, IV, II).

Preferably, all links of a communication system according to the invention are protected by means of encryption. For this, standard encryption methods can with advantage be used.

The nodes of a network according to the invention can connect to each other in several ways. One possibility is that the application node 222 and the data source 248 are web or WAP applications in a server to server scenario where the nodes 222, 224 of the application unit as well as the nodes 242, 245, 248 of the data providing unit run from Internet or intranet servers. In a second case the application unit nodes 222, 224 reside in a client, e.g. a PC, a personal digital assistant (PDA) or an advanced cellular phone, while the providing unit nodes 242, 245, 248 run from servers. The application node 222 can for example be a Windows client application and the functions in the access means 224 part of an operating system or a program running in the background. A third example is peer-to-peer communication, where the nodes of both sides run on clients for data sharing without a central data repository.

It should be noted that a communication system in accordance with the invention generally would comprise a more complex network than the basic example of FIG. 2. Such a system includes multiple application units, data providing units and/or service brokers that are able to communicate with each other. Furthermore, it is to be understood that all nodes belonging to the same unit in FIG. 2 not necessarily have to be arranged at the same physical location. The databases 248, 254, respectively, may for example be located at another physical device than the nodes 242, 252, respectively.

The invention thus uses a structure based on the classic Lock Box to provide web services in a secure manner. The web services are published at the service broker through a new procedure for brokered publishing. The communication is mainly SOAP based and a new type of SOAP messages, so called encapsulated SOAP messages is used to achieve a secure three-part communication. Brokered web service publishing and encapsulated SOAP messages are closely linked features necessary for the invention. A common sign on mechanism is preferably also provided, which handles user identities and interacts with the mentioned features to further improve the system security and performance. The respective mechanisms for brokered publishing, common sign on and encapsulated SOAP messages will now be described more thoroughly.

Brokered Publishing

Still referring to FIG. 2, a fundamental feature of the present invention is the web service publishing that is performed at the service broker 250. Assume that a content provider would like to offer a service, typically involving person-related data in its associated data source 248, via a web service interface. A web service description is then transferred from the providing unit 240 to the service broker 250 (I). The web service description preferably comprises a WSDL file with information about how to invoke the service but may also include additional information parameters, such as the price for using the service, periods of validity for the service and price, a contact address for the service, etc. The WSDL file is stored at the WSDL server 258 of the service broker.

The broker registers information about the web service at the UDDI server 256, whereby it becomes published in a look up register together with a number of other services. The web service information published in the UDDI registry generally includes an identity for the service and the address (e.g. the Uniform Resource Locator, URL) of the service provider. The web service information for each web service in the UDDI is linked to the respective WSDL file. Thereby, any application provider/developer can access the UDDI registry in search for service data to be used in a new application and download the web service description of appropriate services.

Upon receiving a web service description from the data providing unit 240, the service broker 250 suggests a policy for privacy and information element control to the providing unit. After a successful handshaking procedure, the broker adds the agreed policy into the policy repository 252, which stores it in its database 254. The policy preferably comprises a DTD or XML schema agreement. The policy is at this stage generic and does not relate to a particular end user. However, later on user-specific policies can be created.

When a number of services have been assigned respective policies and published at the service broker, it is thus possible for an end user to adapt these policies by defining his own rules concerning to which requesters the personal data is to be available. This could be done by contacting the service broker, e.g. via the Internet or a WAP enabled phone. Alternatively, if the end user has not personalized the policy for a service in advance, he can be invited to do so upon requesting the service.

Preferably, the system of the invention uses further security mechanisms, e.g. corresponding to those described in [2], to achieve secure web service publishing. The access means of the application unit is for example preferably assigned an identity by the service broker.

By means of the invention, it is possible to publish a web service without having to worry about who is requesting the service. The service broker ensures that a high degree of security and privacy is preserved. Moreover, the invention likewise enables requesting a web service without having to worry about who is responding. This means that checks in order to make sure that the service is requested from a reliable party are no longer needed, since the service broker is a trusted party.

Another major advantage of the web service handling according to the invention is that it can be performed in an automated manner requiring a minimum of implementing actions at the application unit. This is due to the fact that the invention allows use of standard tools and methods for web service development, such as the WSDL and UDDI servers. With this web service automation there is for example no need for the requesting application to "hunt down" the structure for XML forms that have to be manipulated to suit each case.

Furthermore, the brokered publishing of the invention enables fast procedures for both uploading and finding web services. New applications can be built in a comparatively simple and fast manner and the overall system performance is hence speeded up.

The present invention considerably increases the availability of the mobile Internet. Today, application developers/application service providers experience a number of difficulties in accessing the service layers and data sources of one or several operators. Specific agreements with several involved operators are often required and different access types have to be handled. The market is restrained since a lot of time, money and effort is spent on negotiations with operators and on developing access techniques. This is avoided by means of the proposed service broker solution, according to which the support is the same for different sources of information. Small companies can open mobile Internet sites and automatically collect money, without having to worry about building a user registry of their own or negotiating about access to the service layers of one or several operators. Thus, the invention allows developers of mobile applications to concentrate on their key issue.

Common Sign On

A preferred embodiment of the invention handles authentication through the new common sign on (CSO) concept. In such a case, redirection occurs from the application node 222 to a CSO server 255, to which a set of credentials, such as a user name and a password, is input. The credentials are requested every time a new application is accessed by the user. The CSO server creates a general digital user identity for authentication, which is encrypted such that it can only be read by the service broker 250.

The fact that the digital user identity is only valid in the service broker domain 250 implies that the protected user identity returned to the application node 222 cannot even be read by the application node itself. This results in enhanced security and at the same time allows for a new kind of application service provider that is principally interested in selling its application/service and does not care about customer identities. Still, CSO does not in any way exclude traditional application service providers with customer databases.

As illustrated in FIG. 2, the CSO server 255 is preferably arranged within the service broker 250 to communicate with the policy repository 252. Thereby, the CSO server can alert the policy repository of an expected request at an early stage. By forwarding the user and service identities to the policy repository, the policy repository is given the opportunity to contact its database 254 and prepare for the request by retrieving the associated policy. In this way, there is a fast response when the actual request is received, resulting in the further improved performance of a real time system.

It is preferred that an identity of the CSO node is transferred via the application node (A) and the access means (B) to the policy repository (C) in case of a successful authentication. Together with the preparation initiating message sent from the CSO service to the policy repository, this provides the policy repository with appropriate information for interpreting the session identity.

CSO only requires one set of credentials for all applications connected to the network. In this respect, the CSO authentication of the invention is similar to conventional single sign on (SSO) mechanisms, e.g. Microsoft Passport™. However, whereas SSO only requires credentials to be given once for each respective session, CSO requires credentials to be given every time a new application is accessed. This means that the risk of abuse is reduced. If the device is stolen during an open security session, abuse is limited to this particular application.

In a favorable scenario, the CSO server 255 is run and managed by a mobile operator, which means that the operator provides the digital identities. The circle of trust is thereby extended by the invention in the sense that enablers (e.g. mobile positioning centers, multimedia messaging service centers, charging nodes or other nodes in the operator's service layer) can trust the identities. Moreover, by managing digital identities via a CSO server, the operators are close to the end users and can safeguard their positions.

There may be embodiments where the CSO server is connected to other identity providers, including Microsoft Passport™ or products compliant to Liberty Alliance specifications. This simplifies the end user management, since the same credentials can be used in the CSO as elsewhere.

To sum up, through CSO the invention offers a safe authentication mechanism that does not rely on trusting external parties and by means of which the risk of abuse is reduced. CSO also results in an improved performance of the policy repository.

Encapsulated SOAP Messages

Figure 3A:
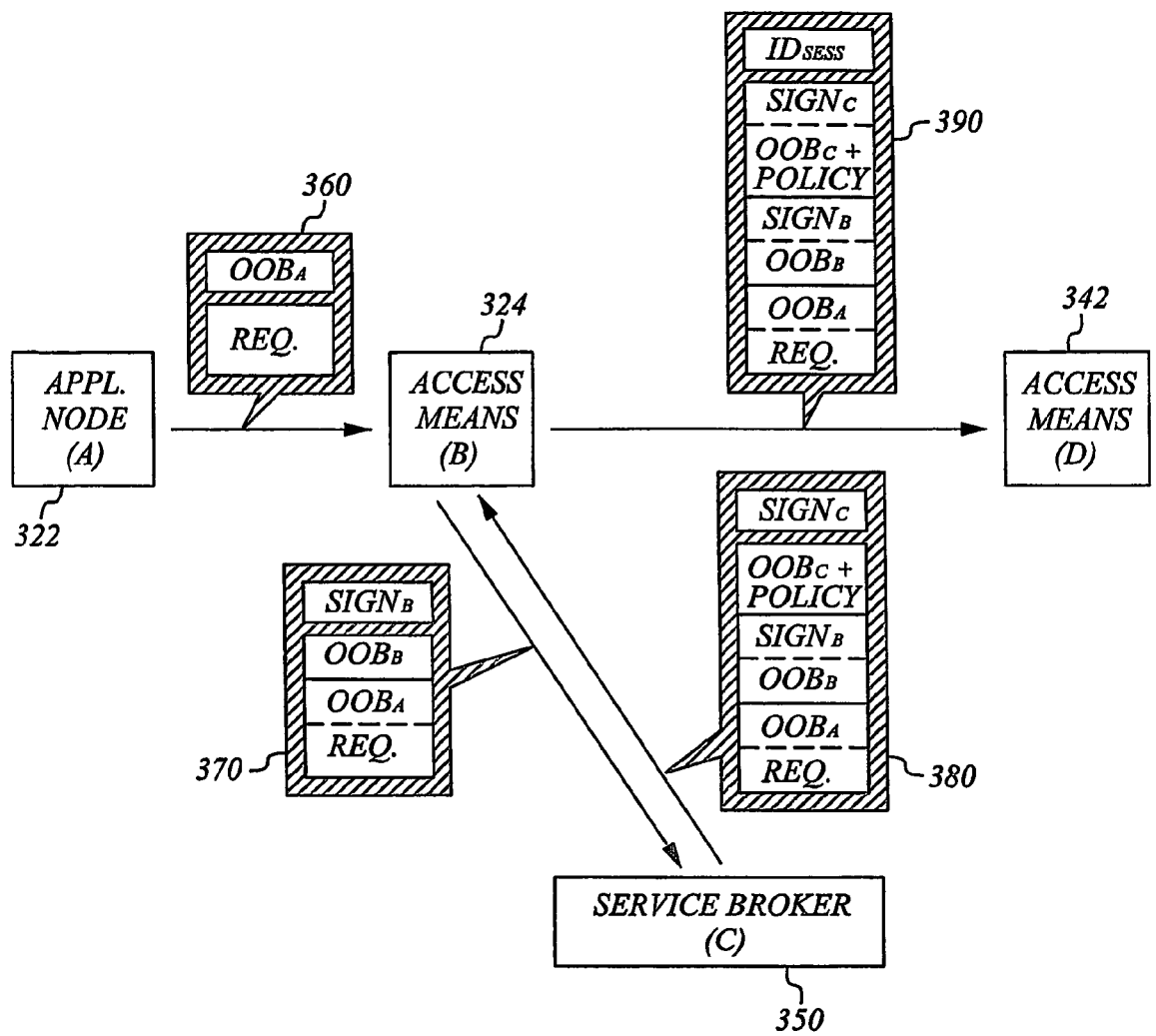
FIG. 3A illustrates messaging through encapsulated SOAP messages according to a first exemplary embodiment of the present invention.

FIG. 3A illustrates messaging through encapsulated SOAP messages according to a first exemplary embodiment of the invention. The participating units are the application node (A) 322 of the application unit, the gateway/access means (B) 324 of the application unit, the service broker (C) 350 and the gateway/access means (D) 342 of the data providing unit. The application node A wants to retrieve information or request a service involving personal data, the location of which it does not know. In the first messaging stage, A uses SOAP to invoke access means B, typically over an intranet or within the same node. The message 360 sent from A to B comprises a conventional SOAP envelope with a header and a body. The header contains OOB data, such as for example a signature from A, a time stamp and identities for the requested service/data, the node A, the end user and/or the person performing the request. The body, on the other hand, contains a payload message with the actual request. The request is typically implemented through a standard XML form.

In the next stage, B creates an encapsulated SOAP message 370, which is sent to the policy repository (252 in FIG. 2), of the service broker C. Hereby, SOAP based on HTTPS would generally be used. The original SOAP message 360 from A is encapsulated in the body of the message 370. B adds its own identity, possibly together with OOB data corresponding to the above-mentioned example OOB from A and other OOB data (e.g. related to the maximum service cost), to the SOAP body. Preferably, the header of the message 370 only contains a signature provided by B, in which case the entire body is protected from manipulation.

When the policy repository of C receives the message with the encapsulated A request from B, it retrieves the appropriate policy from its associated database (254 of FIG. 2). This policy is returned to unit B in a new encapsulated SOAP message 380 signed by C. Besides the policy, the message body preferably contains additional OOB data from C as well as the previous message 370. This additional OOB data can for instance include an identity of C, the IP address of D, the user identity in D (issued by C) and information about where validation is to take place and how long the policy is valid (a best-before time stamp), etc.

Unit B finally encapsulates the message 380 received from C (preferably after performing a "best before time" check thereof) into another SOAP message 390 and transmits this message to the access means D of the data providing unit. In the illustrated example, all components of the message 390 are already signed at other units participating in the messaging scheme, as well as provided with a best-before time stamp from C 350, and therefore yet another signing by B would be superfluous. However, it is preferred to include a session identity in the header of the message 390, whereby parameters can be related to a specific session and thus saved during the session for restoration purposes.

More information about the OOB data added by the units A, B and C, respectively, can be found in [2].

Figure 3B:
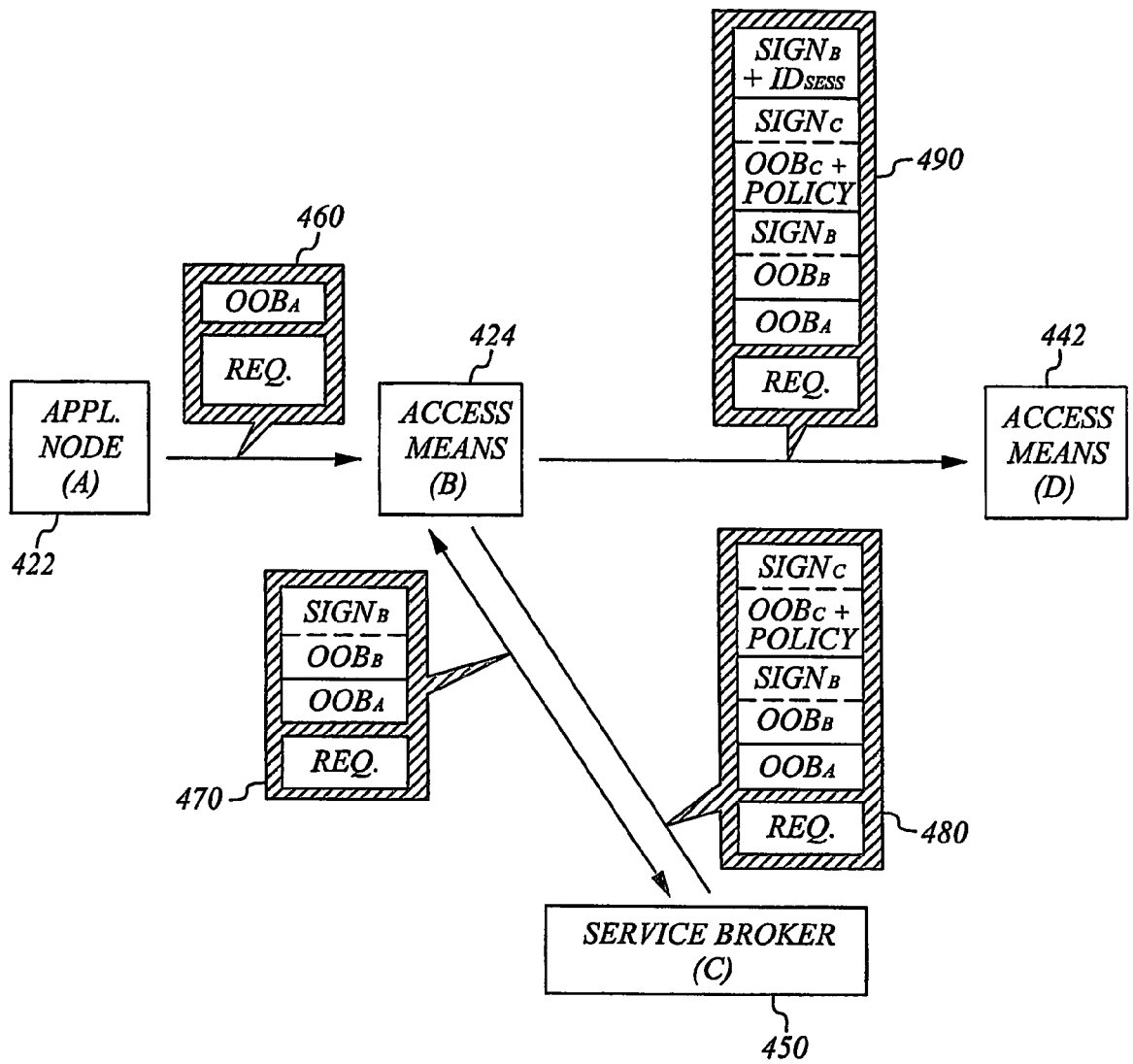
FIG. 3B illustrates messaging through encapsulated SOAP messages according to a second exemplary embodiment of the present invention.

FIG. 3B illustrates messaging through encapsulated SOAP messages according to a second exemplary embodiment of the invention. The messaging in FIG. 3B resembles the one in FIG. 3A in that a new SOAP message 470, 480, 490 is built in each stage by encapsulating the previous SOAP message 460, 470, 480. Furthermore, the components of the messages are basically the same. However, while everything except the current signature was arranged in the body of the SOAP message in FIG. 3A, new components are instead added to the header of the respective messages 470, 480, 490 in FIG. 3B. Hence, the bodies of the messages merely contain the original payload message from A. A consequence of this is that, to achieve maximum security, it can in some cases be appropriate to let access means B 424 sign the message 490 destined for access means D 442, as in the illustrated example. However, this signing event can also be left out, for example if the gained security is not considered to outweigh the system effort associated with the signing.

FIGS. 3A and 3B illustrate two different approaches as for whether the added data is arranged in the header or body of the encapsulated SOAP messages. The preferred way is to put everything except the most recent signature in the SOAP body to obtain a maximum security. However, as illustrated by FIG. 3B, it is also possible to instead arrange at least part of the added data in the SOAP header. Such an approach results in a faster signing procedure and may be appropriate in situations where the participating parties trust each other. Decisions related to if and to what extent data can be placed in the SOAP header instead of in the body involve a compromise between security and performance.

The solutions of FIGS. 3A and 3B offer a centralized messaging scheme where the entire message from A is passed on to the service broker C. The request is visible to C, which can compare the request against the associated policy in its database to check whether the request is allowed or not. In a preferred embodiment, C performs such a validation of the request and thereafter sends an explicit indication of the result to B. If the request is allowable, an indication thereof is included in the OOB of message 380, 480 and the messaging scheme is continued with the message 390, 490 to D as in FIGS. 3A and 3B. However, should C encounter an illegitimate request, an indication telling that access is denied is instead included in the OOB returned to B, whereafter the messaging procedure is interrupted. An attempt by a malicious/hacked B to still contact D with the encapsulated SOAP message will fail, since D rejects it upon seeing the indication signed by C.

The above-described solution where C checks the request has the advantage that it results in an early validation where B quickly receives a notice of whether the request will succeed or not. However, the invention also covers embodiments where C just forwards the retrieved policy together with the request and the validation is performed at a later stage, for instance at unit B or D.

Figure 4:
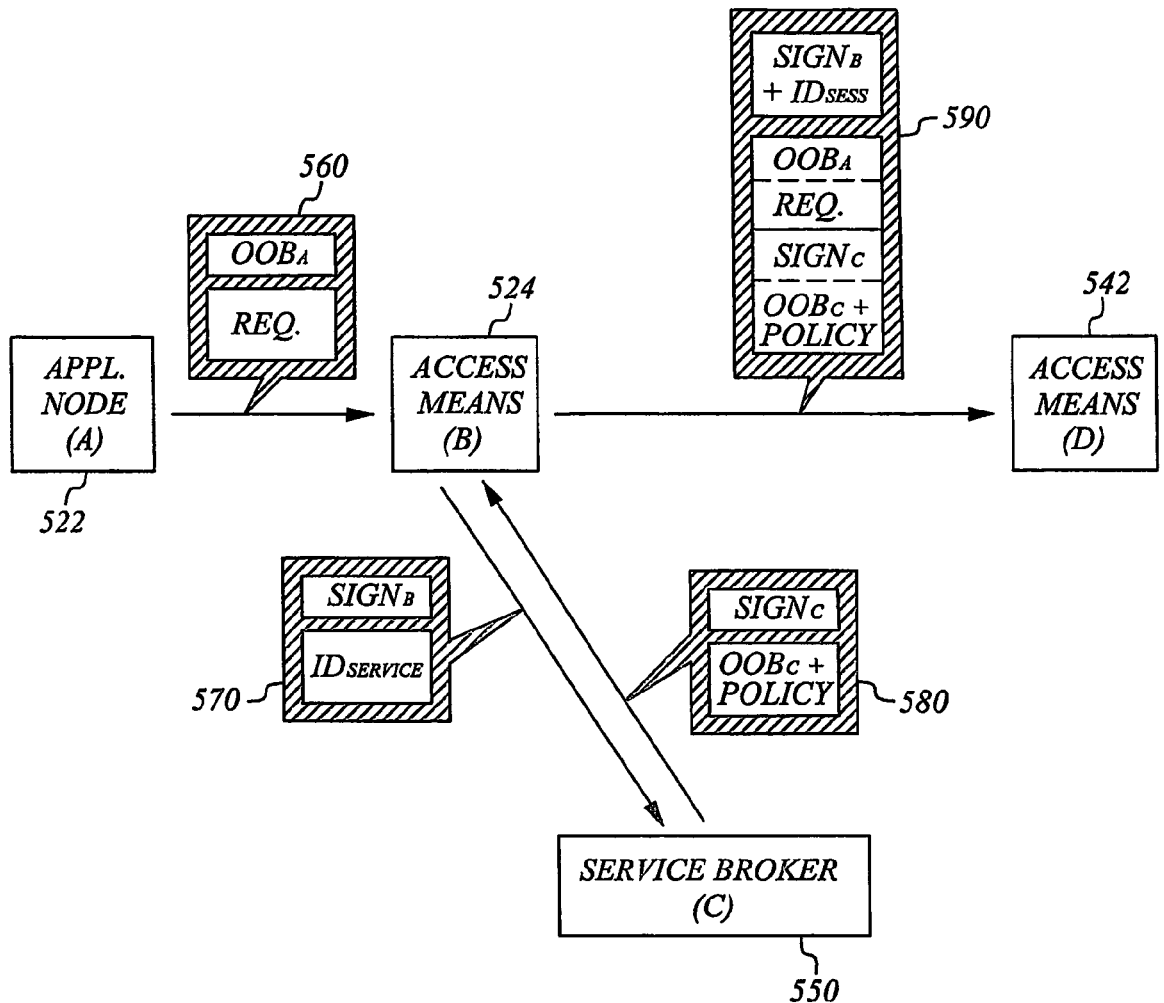
FIG. 4 illustrates messaging through encapsulated SOAP messages according to a third exemplary embodiment of the present invention.

FIG. 4 illustrates messaging through encapsulated SOAP messages according to a third exemplary embodiment of the invention. In this approach, the access means B 524 of the application unit has a crucial role. The first stage, where A 522 requests a service by sending a SOAP message 560 to B, is the same as before. Thereafter, B reads the request and determines which information therein that should be passed on to unit C 550. This information generally comprises the identity of the requested service, which is placed in the body of a SOAP message 570 signed by B and sent to C. Thus, C is not provided with all details concerning the request but merely a minimum of information needed for retrieving the appropriate policy. This messaging scheme is totally different from the above cases where B incorporated the entire XML form with the payload message in the new SOAP message for C irrespective of its content.

The policy repository of C collects the policy that matches the service identity from its associated database and creates a SOAP message 580 with OOB including the policy in the body and a signature by C in the header. The message 580 is sent to B, which encapsulates it in the SOAP message 560 from A, forming a message 590 sent to D 542. Equivalently, the message 560 can be incorporated in the message 580. In either case, the encapsulated SOAP message 590 preferably contains a header with a signature by B for a body comprising the content of messages 560 and 580.

In the messaging scheme illustrated in FIG. 4, the service broker C 550 generally does not have enough information to decide whether the request is allowed. This decision therefore has to be made at a later stage, e.g. at B 524 and/or at the data providing side, to which units the original A request and the policy from C are both available. It would generally be preferred to validate the request at D 542.

The encapsulated SOAP messaging schemes of FIGS. 3A, 3B on the one hand and 4 on the other hand each have their pros and cons and the choice of messaging procedure is basically determined by the degree of trust put in the access means 324, 424, 524 of the application unit. If this access means is considered less trustworthy, it may be appropriate to use the scheme of FIG. 3A, which is very secure. Then, a centralized solution is achieved since the service broker 350 sees the request and can check whether it is allowed or not. This means that the service broker can refuse to forward a non-admissible request. The drawback of such a centralized solution is that all information from A 322, including the XML request form, goes through the service broker, which becomes the "bottleneck" of the system. From a load-optimizing point-of-view it is therefore preferred to use the scheme of FIG. 4 if the access means on the application side is trusted.

It should be emphasized that the messaging procedure described with reference to FIGS. 3A, 3B is not excluding the one described with reference to FIG. 4 and vice versa. In fact, a preferred embodiment of the invention employs both methods running in parallel. The choice of messaging procedure for a particular situation is then determined by trust and performance considerations, above all the degree of trust put in the access means of the application unit.

In the described messaging schemes, the service broker is for request validation purposes invoked from the application unit. Sometimes it can be appropriate to invoke the service broker from the providing unit as well, for example if the provider has doubts about the authority of the requester. Such cases also lie within the scope of the invention.

Figure 5:
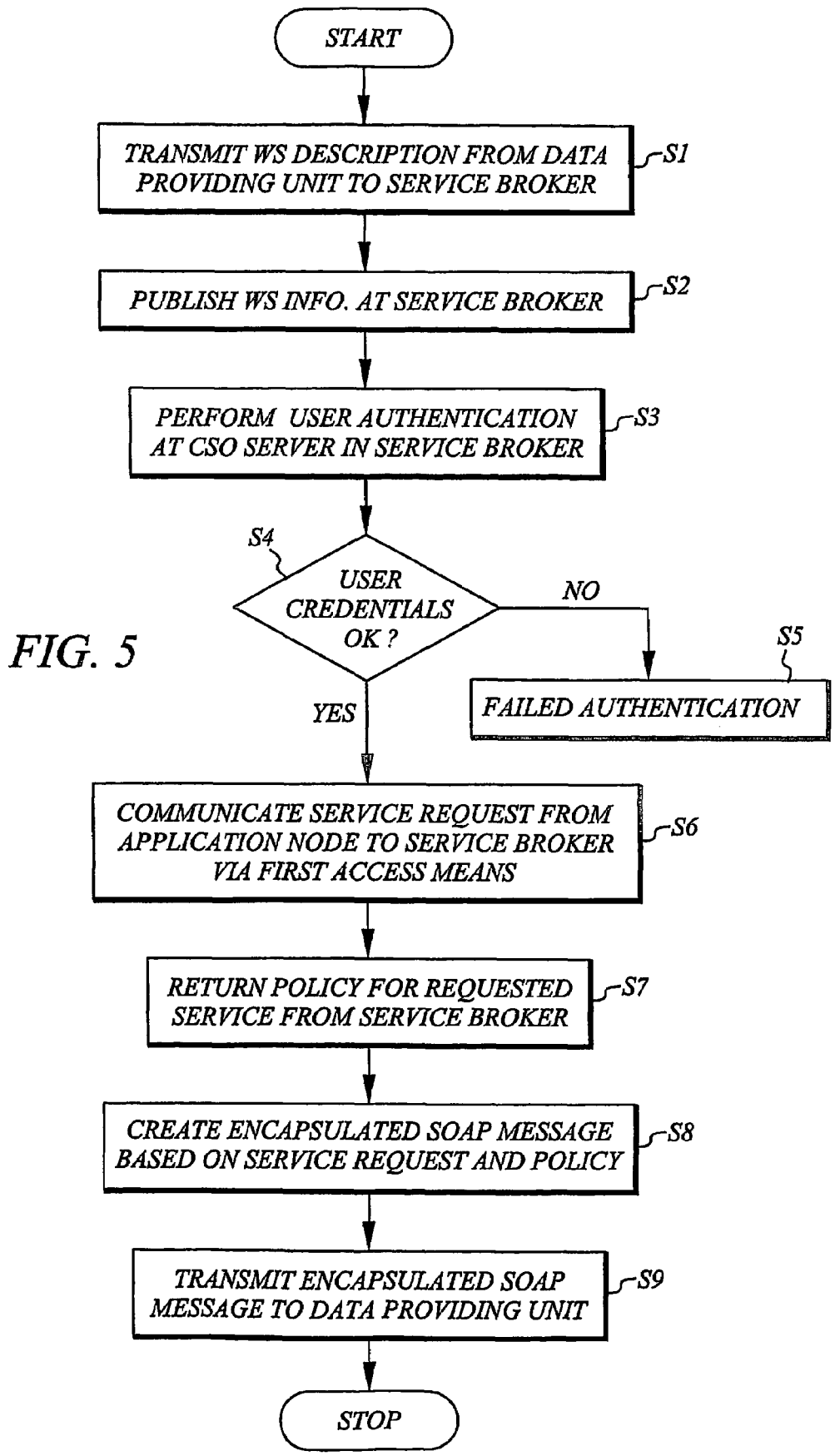
FIG. 5 is a flow chart of a method for end user controlled handling of personal data according to a preferred embodiment of the present invention.

FIG. 5 is a flow chart summarizing a preferred method for end user controlled handling of personal data according to the invention. The procedure starts with offering web services at the broker. A web service description comprising a WSDL file is transferred from the data provider that controls the data/ service to the service broker in a step S1. The service broker suggests a privacy policy for the service and in a step S2 web service information with a pointer to the web service description is published at the UDDI registry of the service broker. The steps S1 and S2 are generally repeated, filling the web service registry with a number of services offered by several different providers. An application developer/provider can thereafter search the open web service registry in order to provide end users with services compliant with their needs. The respective service policies may either be personalized by the user in advance or upon requesting a service.

The pull/push procedure starting when an application node requests a particular service is outlined in steps S3-S9. User authentication is preferably performed at a CSO server in the broker upon each application request (step S3). Hereby, the CSO server uses a digital user identity only valid in the service broker. Step S4 asks whether the authentication was successful. If not, the procedure ends in step S5. In case of a successful authentication, on the other hand, the service request is communicated from the application node to the service broker via the access means/gateway of the application unit (step S6). The service broker matches the service identity with a user defined policy (privacy agreement) that is returned to the access means of the application unit is step S7. In step S8, this access means preferably creates an encapsulated SOAP message in order to transfer the service request from the application node and the policy from the policy repository in a reliable manner. The encapsulated SOAP message is transmitted to the data providing unit in step S9, which retrieves the requested data from its database, possibly after checking the request against the associated policy.

The present invention is especially useful for providing web services involving personal data. However, it can also be used for general web services not requiring any person-specific information. The service broker can for instance use a fictitious end user and password for handling such services.

Although the invention has been described with reference to specific illustrated embodiments, it should be emphasized that it also covers equivalents to the disclosed features, as well as modifications and variants obvious to a man skilled in the art. For instance, information elements of the SOAP messages can in all cases be moved from body to header, and vice versa. Thus, the scope of the invention is only limited by the enclosed claims.

REFERENCES

[1] "Web Service Gotchas—How enterprises can build secure reliable performance-optimized service solutions while waiting for the standards to mature", Bloor Research NA, July 2002.
[2] U.S. patent application Ser. No. 09/976,500 (Pub. No. 2003/0074456 A1), Ericsson Inc.
[3] U.S. patent application Ser. No. 09/994,339, Ericsson Inc.

The invention claimed is:

1. A method for end user controlled handling of personal data in a communication system including an application unit with a first access means arranged to communicate with a data providing unit and a service broker comprising the steps of
transmitting a description of a web service from the data providing unit to the service broker;
publishing, at the service broker, web service information associated with the web service description;
communicating, based on a predefined web service protocol, a service request from an application node of the application unit to the service broker via the first access means; and
returning, based on the predefined web service protocol, an end user controlled privacy agreement for the requested service from the service broker to the application unit.

2. The method of claim 1, wherein the predefined web service protocol is a predefined Extensible Markup Language (XML) web service protocol.

3. The method of claim 2, wherein the predefined XML web service protocol is the Simple Object Access Protocol (SOAP).

4. The method of claim 3, further comprising the steps of:
creating, at the first access means an encapsulated SOAP message based on the service request and the privacy agreement; and transmitting the encapsulated SOAP message from the first access means to a second access of the data providing unit.

5. The method of claim 4, further comprising the steps of:
receiving, at the first access means, a SOAP request message from the application node;
communicating a first intermediate encapsulated SOAP message including the SOAP request message from the first access means to the service broker
communicating a second intermediate encapsulated SOAP message including the first intermediate encapsulated SOAP message and the privacy agreement from the service broker to the first access means; and
forming the encapsulated SOAP message for the data providing unit by incorporating the second intermediate encapsulated SOAP message.

6. The method of claim 5, comprising the steps of:
arranging substantially all content of the encapsulated SOAP messages in a SOAP body thereof; and
signing the first and second intermediate encapsulated SOAP messages respectively, at the first access means and the service broker respectively.

7. The method of claim 5, comprising the steps of:
arranging substantially all content except the service request of the encapsulated SOAP messages in a SOAP header thereof; and
signing the respective encapsulated SOAP message.

8. The method of claim 4, wherein the creating step in turn comprises:
encapsulating the content of a first SOAP message in a second SOAP message whereby one of the messages comprises the service request from the application node and the other message comprises the privacy agreement from the service broker; and
signing the second SOAP message.

9. The method of claim 1, further comprising the step of performing, at a common sign on (CSO) server, an end user authentication event for every application request received at the application node.

10. The method of claim 9, wherein the CSO server is arranged in the service broker to communicate with a policy repository unit thereof.

11. The method of claim 9, wherein the end user authentication event involves a user identity, the validity of which substantially is restricted to the service broker.

12. The method of claim 1, wherein the privacy agreement is selected from the group of a Document TypeDefinition (DTD) agreement and an XML schema agreement stored in the service broker.

13. The method of claim 1, wherein the web service description comprises a Web Service Definition Language (WSDL) file and the publishing step is performed at a Universal Description, Discovery and Integration (UDDI) server of the service broker.

14. A communication system for end user controlled handling of personal data including an application unit with a first access means arranged to communicate with a data providing unit and a service broker, said system comprising:
- means for transmitting a description of a web service from the data providing unit to the service broker;
- means for publishing, at the service broker, web service information associated with the web service description;
- means for communicating, based on a predefined web service protocol, a service request from an application node of the application unit to the service broker via the first access means; and
- means for returning, based on the predefined web service protocol, an end user controlled privacy agreement for the requested service from the service broker to the application unit.

15. The system of claim 14, wherein the predefined web service protocol is a predefined XML web service protocol.

16. The system of claim 15, wherein the predefined XML web service protocol is SOAP.

17. The system of claim 16, further comprising
- means for creating, at the first access means, an encapsulated SOAP message based on the service request and the privacy agreement; and
- means for transmitting the encapsulated SOAP message from the first access means to a second access means of the data providing unit.

18. The system of claim 17, further comprising:
- means for receiving, at the first access means, a SOAP request message from the application node;
- means for communicating a first intermediate encapsulated SOAP message including the SOAP request message from the first access means to the service broker;
- means for communicating a second intermediate encapsulated SOAP message including the first intermediate encapsulated SOAP message and the privacy agreement from the service broker to the first access means; and
- means for forming the encapsulated SOAP message for the data providing unit by incorporating the second intermediate encapsulated SOAP message.

19. The system of claim 18, wherein the content of the first and second intermediate encapsulated SOAP messages, respectively, are signed by the first access means and the service broker, respectively.

20. The system of claim 17, wherein the means for creating in turn comprises:
- means for encapsulating the content of a first SOAP message in a second SOAP message, whereby one of the messages comprises the service request from the application node and the other comprises the privacy agreement from the service broker; and
- means for signing the second SOAP message.

21. The system of claim 14, further comprising a CSO server for performing an end user authentication event every time an application request reaches the application node.

22. The system of claim 21, wherein the CSO server is arranged in the service broker to communicate with a policy repository unit thereof.

23. The system of claim 21, wherein the end user authentication event involves a user identity, the validity of which substantially is restricted to the service broker.

24. The system of claim 14, wherein the privacy agreement is selected from the group of a DTD agreement and an XML schema agreement stored in the service broker.

25. The system of claim 14, wherein the service broker comprises
- a WSDL server for storing a WSDL file of the web service description and
- a UDDI registry for the web service information.

26. An intermediate device belonging to an application unit in a communication system for end user controlled handling of personal data, adapted to communicate with a data providing Linit and a service broker of the communication system and comprising:
- means for receiving a SOAP request message with a service request from an application node of the application unit;
- means for communicating the service request to the service broker using SOAP; means for receiving, from the service broker, a privacy agreement corresponding to the service request;
- means for creating an encapsulated SOAP message based on the SOAP request message and the privacy agreement; and
- means for transmitting the encapsulated SOAP message to the data providing unit.

27. The device of claim 26, further comprising:
- means for communicating a first intermediate encapsulated SOAP message including the SOAP request message to the service broker;
- means for receiving a second intermediate encapsulated SOAP message including the first intermediate encapsulated SOAP message and the privacy agreement from the service broker; and
- means for forming the encapsulated SOAP message for the data providing unit by incorporating the second intermediate encapsulated SOAP message.

28. The device of claim 27, comprising means for signing encapsulated SOAP messages.

29. The device of claim 26, wherein the means for creating in turn comprises:
- means for encapsulating the content of a first SOAP message in a second SOAP message, whereby one of the messages is the SOAP request message from the application node and the other comprises the privacy agreement from the service broker; and
- means for signing the second SOAP message.

30. The device of claim 26, comprising means for encrypting encapsulated SOAP messages.

31. The device of claim 26, comprising means for comparing the SOAP request message against the privacy agreement for authentication purposes.

* * * * *

UNITED STATES PATENT AND TRADEMARK OFFICE
CERTIFICATE OF CORRECTION

PATENT NO. : 7,389,328 B2
APPLICATION NO. : 10/544961
DATED : June 17, 2008
INVENTOR(S) : Yeung et al.

It is certified that error appears in the above-identified patent and that said Letters Patent is hereby corrected as shown below:

On the Face Page, in Field (75), under "Inventors", in Column 1, Line 2, delete "Stockholm" and insert -- Enskede --, therefor.

In Column 12, Line 14, in Claim 4, after "second access" insert -- means --.

In Column 14, Line 16, in Claim 26, delete "Linit" and insert -- unit --, therefor.

Signed and Sealed this

Sixth Day of January, 2009

JON W. DUDAS
*Director of the United States Patent and Trademark Office*